(No Model.) 2 Sheets—Sheet 1.
J. E. PUTMAN.
MEANS FOR OPERATING ELEVATORS.
No. 544,378. Patented Aug. 13, 1895.
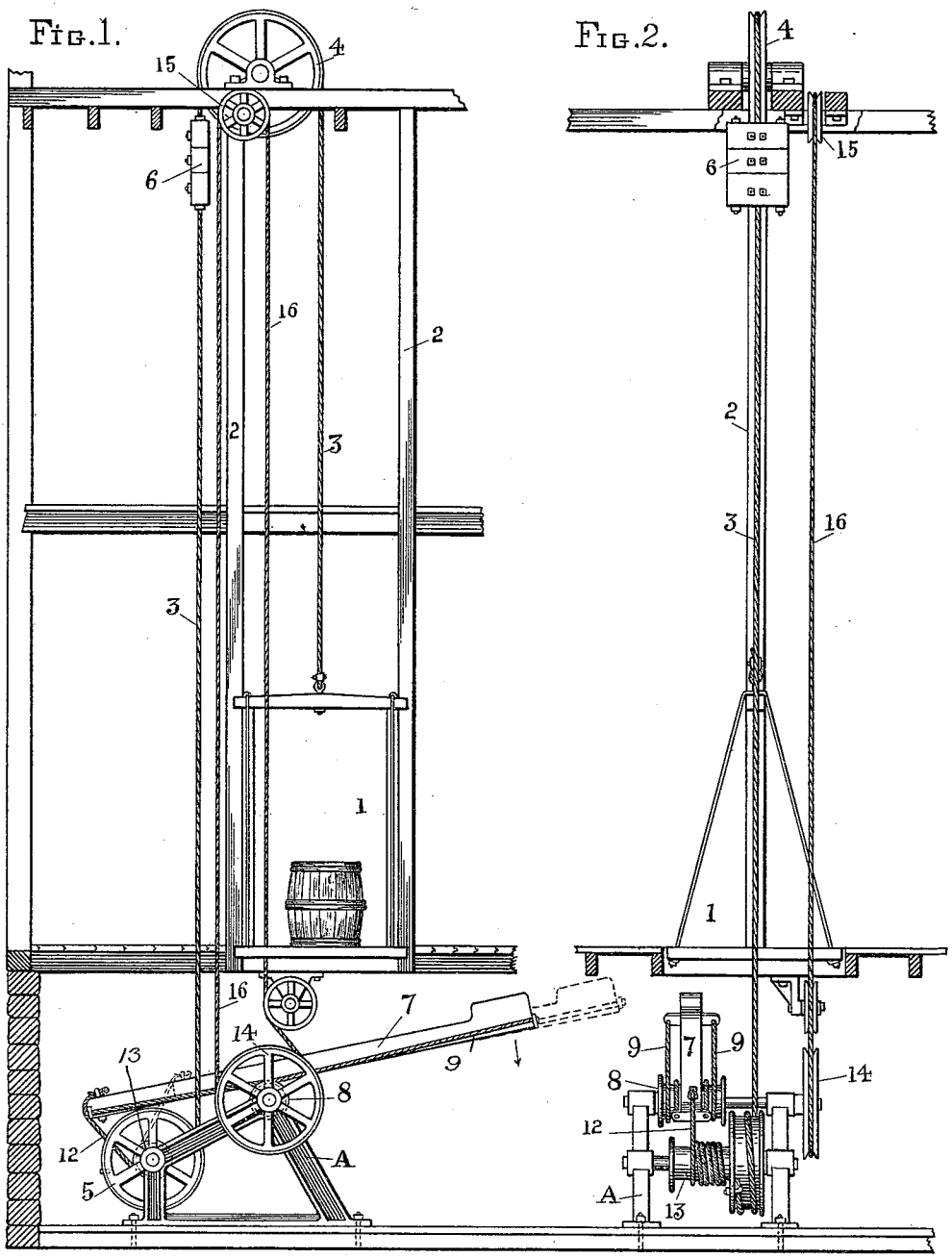
WITNESSES:
David C. Walter
L. E. Brown
INVENTOR
John E. Putman,
BY
Ahram Hall,
ATTORNEY

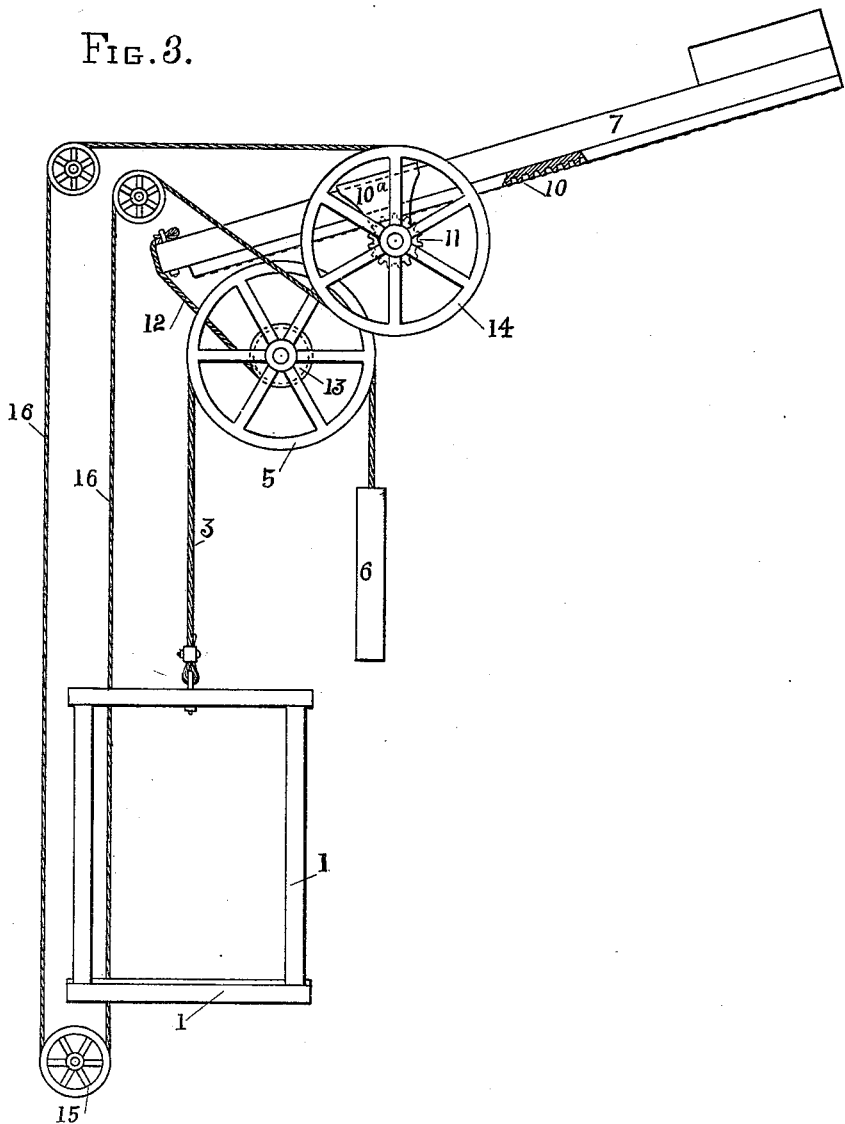

UNITED STATES PATENT OFFICE.

JOHN E. PUTMAN, OF CHICAGO, ILLINOIS.

MEANS FOR OPERATING ELEVATORS.

SPECIFICATION forming part of Letters Patent No. 544,378, dated August 13, 1895.

Application filed June 20, 1895. Serial No. 553,407. (No model.)

*To all whom it may concern:*

Be it known that I, JOHN E. PUTMAN, a citizen of the United States, residing at Chicago, in the county of Cook and State of Illinois, have invented certain new and useful Improvements in Means for Operating Elevators, of which the following is a specification.

My invention relates to means for operating elevators or lifts for passengers and freight, and for other objects or structures which require to be raised and lowered or moved to and fro.

My invention is particularly well adapted to that class of elevators known as "hand-elevators," and its object is to provide simple, cheap, and efficient means for raising and lowering or moving to and fro elevator-cages and other objects or structures. I accomplish this object by means of the mechanism and arrangement of parts hereinafter described, and shown and illustrated in the accompanying drawings, made part hereof, in which—

Figure 1 is a side elevation of my device as applied to an elevator; Fig. 2, an end elevation of the same, and Fig. 3 a side elevation of a modification of the same.

Like numerals represent like parts throughout the several views.

In the drawings, 1 is the cage traveling vertically on ways 2 and supported and raised and lowered by rope 3, passing over pulley 4, secured to hoisting-pulley 5, and provided with 6, the usual counterbalance to the cage.

7 is a heavy, powerful lever, preferably a beam of iron, heavily weighted at its free end, resting and fulcrumed upon roller 8, journaled in the frame A. The lever 7 is secured to the roller in such manner that the lever may be shifted longitudinally upon the roller without lateral or vertical displacement by means of either ropes 9, secured to the lever at both ends and passing around the roller 8, as shown in Figs. 1 and 2, or by means of rack and gear teeth 10 11 and keeper 10ª, as shown in Fig. 3. To one end of the lever 7 is secured a stout rope or cable 12, leading to and wound upon a drum 13, fixed to the shaft of the hoisting-pulley 5. This drum is preferably of less diameter than the pulley 5. Upon one end of the shaft of roller 8 is secured a pulley 14, over which and over pulley 15 passes an endless rope 16, which, in its course, leads vertically, but without touching, through the cage 1, within convenient reach of the operator.

The operation of my device is as follows: Assuming that the cage is to be raised, the operator pulls down on the rope 16, causing its pulley 14 to rotate, giving motion to roller 8, to which it is secured, which causes the lever 7 to travel longitudinally upon the roller, thus shifting the fulcrum-point of the lever. When the free end of the lever has been projected sufficiently beyond its bearing for its weight and leverage to overcome the resistance of the cage and its load, the free end of the lever begins to fall, and as the opposite end of the lever rises it pulls upon the rope 12, which, as it unwinds from its drum 13, gives motion through its shaft to pulley or lifting drum 5, to which the hoisting-rope 3 is secured. The revolution of the lifting pulley or drum 5 causes one end of the hoisting-rope to wind upon this drum, thus lifting the cage secured to the opposite end of the hoisting-rope. Now, if it is desired to lower the cage the opposite operation takes place—that is to say, the rope 16 is pulled upwardly by the operator, causing pulley 14 and the roller upon which it is journaled to move the lever longitudinally until the fulcrum-point shall be so near the center of gravity of the lever that the weight of the cage and its load overbalances the resistance of the free end of the lever. The free end of the lever now swings upwardly, and as the opposite end of the lever falls the rope 12, attached to one end of the lever, is wound upon its drum while the hoisting-rope is paid out, permitting the cage to descend.

It will be understood that the operator may, with care, hold the cage and its load and the lever 7 so delicately balanced that the cage will neither ascend nor descend, and that the excess of the pull of the lever upon the cage or the pull of the cage upon the lever may, by properly shifting the lever, be made so slight or so great that the cage may be caused to travel in either direction as rapidly as may be desired.

Of course the elevator may and should be provided with a proper brake (not shown in the drawings) under the control of the operator, and which may be of any well-known form. The lever, its supports, and the mechanism by which its fulcrum-point is shifted may be located at any convenient point with reference to the load, either immediately beneath the load, as in Figs. 1 and 2, or directly above, as in Fig. 3, or at any remote point from which the controlling and hoisting ropes may lead to the load.

Other means of connecting the lever with the load and of operating the lever-shifting mechanism will suggest themselves to those skilled in the art, and I do not, therefore, limit my invention merely to the specific devices provided for these purposes here shown for the purpose of illustration.

What I claim as my invention, and desire to secure by Letters Patent, is—

1. A means for operating elevators and the like, comprising a lever, a weight, such as a cage, suitable connections intermediate said weight and said lever, and means for shifting the fulcrum of said lever, substantially as and for the purpose specified.

2. A hoisting-lever, a hoisting-drum, connections between one end of said lever and said hoisting-drum, and a roller or shaft forming a fulcrum for said lever, in combination with means for rotating said roller or shaft, whereby said lever is moved longitudinally and the fulcrum-point of said lever is shifted, substantially as and for the purpose specified.

3. A hoisting-lever, a weight, such as a cage, suitable connections intermediate said lever and its load, and means for shifting the fulcrum of said lever, in combination with means for movably securing said lever against displacement from its fulcrum-piece, substantially as and for the purpose specified.

4. A hoisting-lever, a lifting-drum, a drum of less diameter on the shaft of said lifting-drum, a rope leading from one end of said lever around said drum of lesser diameter, a weight, such as an elevator cage, and a rope leading from said weight to said lifting-drum, in combination with a roller or shaft forming a fulcrum for said lever, a pulley on said roller or shaft, and a rope leading around said pulley and to a point convenient to the operator, all substantially as and for the purpose specified.

JOHN E. PUTMAN.

In presence of—
DAVID C. WALTER,
L. E. BROWN.